United States Patent Office 3,684,538
Patented Aug. 15, 1972

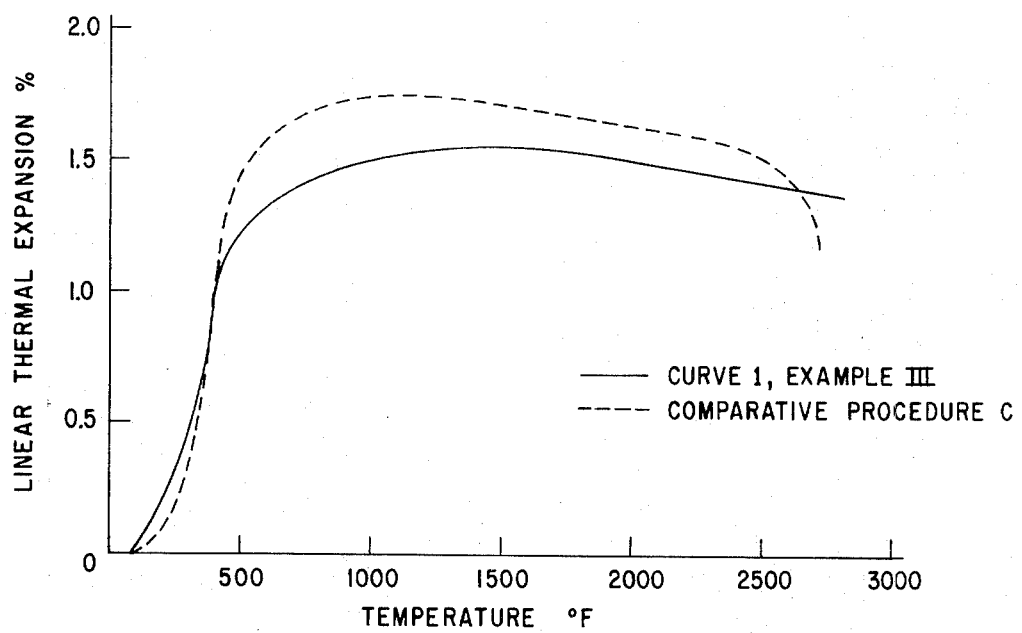

3,684,538
PRODUCTION OF SILICA BRICK
Edmund S. Wright, Clearfield, Pa., assignor to General Motors Corporation, Detroit, Mich.
Filed Oct. 28, 1970, Ser. No. 84,736
Int. Cl. C04b 35/14
U.S. Cl. 106—63
8 Claims

ABSTRACT OF THE DISCLOSURE

An improved method for producing a silica refractory of size-graded silica and a mineralizer. The improvement consists of introducing into the brick or grain calcium chloride or calcium nitrate dissolved in a tempering liquid as a replacement for part of the mineralizer. Excessive absorption of moisture is prevented prior to firing, and sealing of the brick pores during drying is prevented when calcium chloride is substituted for part of the mineralizer.

BACKGROUND OF THE INVENTION

This invention relates to a method for producing an improved silica brick.

Silica bricks have a wide range of industrial uses which include coke ovens, glass plant furnaces, acid electric furnaces and open-hearth furnaces. Coke ovens generally consist of a long series of chambers, each forming a retort and heated, as far as possible, by waste heat from previous chambers. The design of the ovens necessitates the use of bricks which will resist the temperature of 2800°* for an indefinitely long time, and are not affected by sudden changes in temperature. The silica bricks must be sufficiently resistant to abrasion to resist that caused by inserting and withdrawing the materials from the oven. Furthermore, the bricks advantageously should have a high conductivity to reduce the temperature gradient and should have a low permeability to gases at temperature attained in use.

Continued progress in efficient glass plant furnace operations has brought about a great increase in the glass tonnage produced by the furnaces. As the glass tonnage per day per cubic foot of furnace volume increases, the severity of operating conditions which the refractories are required to withstand increases also. The higher temperatures employed produce a greater amount of batch carry-over and volatile fluxes. Lime and soda and violatile alkalis have an extremely corrosive effect on the bricks used in the furnace. Silica bricks are used almost universally in the furnace crowns. The crown brick must especially be able to withstand penetration and condensation of volatile alkalis. Even a small decrease in permeability is sufficient to effect an appreciable decrease in the amount of alkali absorbed by the brick.

SUMMARY OF THE INVENTION

The present invention is directed to an improvement in the production of silica brick of low porosity and permeability from a batch of size-graded silica and a mineralizer, e.g., magnesia or hydrated or highly burned caustic lime. The improvement consists of introducing into the brick or grain calcium chloride or calcium nitrate dissolved in a tempering liquid, as a replacement for part of the mineralizer, preventing excessive absorption of moisture prior to firing and preventing sealing of the pores of the brick during drying when calcium chloride is substituted for part of the mineralizer.

REFERENCE TO DRAWING

The drawing is a plot of linear thermal expansion in percent versus temperature in degrees F. for (1) a brick prepared according to the method of the invention and (2) a brick produced by a prior art method.

Accordingly, it is an object of this invention to provide an improved method of forming silica shapes, having an increased density and decreased porosity and permeability.

It is a further object of this invention to provide an improved method of forming a green, unfired silica refractory shape that is higher in green density than those made according to the conventional practice.

Further objects and advantages of the invention will becomes apparent from the following description and examples.

The instant invention will be more fully understood from the following examples, which describe preferred specific embodiments. The following examples are presented to clearly illustrate preferred embodiments of the invention and are not intended to be construed as a limitation of the scope thereof.

In the examples, as elsewhere herein, the terms "percent" and "parts" refer to percent and parts by weight, unless otherwise indicated. All fractions of materials shown as mesh sizes refer to Tyler standard screen sizes, unless otherwise indicated. In the examples, as elsewhere herein, the term "specific gravity" refers to apparent specific gravity.

EXAMPLE I

A refractory batch having the following composition was prepared by dry-mixing silica, lime, lignin sulfonate and fumed silica [1] and tempering the dry mix with a solution of $Ca(NO_3)_2$:

| | Parts |
|---|---|
| Silica pebble [1] | 100 |
| Added: | |
| CaO added as $Ca(OH)_2$ | 1.52 |
| Fumed silica | 4.0 |
| Lignin sulfonate | 0.5 |
| CaO added as $Ca(NO_3)_2$ (50% aqueous solution) | 1.19 |

[1] Agglomerated quartzite pebbles mined in Pennsylvania.

The silica pebble had the following composition:

TABLE I

| | Percent |
|---|---|
| $SiO_2$ (by difference) | 99.49 |
| $Al_2O_3$ | 0.18 |
| $Fe_2O_3$ | 0.20 |
| $TiO_2$ | 0.02 |
| CaO | [2] Trace |
| MgO | Trace |
| $Na_2O$ | 0.02 |
| $K_2O$ | 0.02 |

[2] Less than 0.01% by weight.

The silica pebble had the following grain sizing, indicated by percentages of fractions:

TABLE II

| | Percent |
|---|---|
| −3+6 mesh | 32 |
| −6+12 mesh | 12 |
| −12+35 mesh | 16 |
| −35 mesh | 6 |
| −100 mesh | 34 |

The batch ingredients were then formed into bricks in a hydraulic press under a pressure of approximately 14,000 p.s.i. The bricks were removed from the press, and cured at about 250° for about 12 hours. The bricks were then

---

*All temperatures herein and in the appended claims are expressed in degrees Fahrenheit.

[1] The fumed silica was amorphous volatilized silica from the ferrosilicon process, sub-micron in particle size.

subjected to a three week firing schedule, reaching a maximum temperature of approximately 2650° which temperature was maintained for a minimum of 8 hours.

The above described bricks were tested for green bulk density before curing; and after burning they were tested for bulk density, apparent porosity, modulus of rupture at room temperature, absorption, specific gravity, cold crushing, and load to failure. All physical test results contained herein represent an average of five samples. Test results for the brick of Example I are tabulated in Table III:

TABLE III

| | |
|---|---|
| Green: Bulk density (p.c.f.) | 149.0 |
| Burned: Bulk density (p.c.f.) | 122.7 |
| Modulus of rupture (p.s.i.) | 1097 |
| Cold crushing (p.s.i.) | 9909 |
| Specific gravity | 2.32 |
| Absorption (percent) | 7.70 |
| Apparent porosity (percent) | 15.15 |
| Load to failure (temperature) | 3110° |

Both green and burned bulk density were determined by ASTM[1] method C134-41. The modulus of rupture at room temperature was determined by ASTM method C133-55. The cold crushing strength was determined by ASTM method C133-55.

The specific gravity, absorption, and apparent porosity were determined by ASTM method C20-46. Load to failure was determined by ASTM method C-16-62, time-temperature schedule number 4.

Comparative Procedure A

For purposes of comparison, but not in accordance with the invention, dense silica brick were prepared and fired by the same procedure detailed in Example I, except that $Ca(NO_3)_2$ was not added to the refractory mix. The silica pebble used had the same chemical composition and sizing shown in Table I and Table II. The batch had the following composition:

| | Parts |
|---|---|
| Silica pebble | 100 |
| Added: | |
| CaO added as $Ca(OH)_2$ | 3.04 |
| Fumed silica | 4.00 |
| Lignin sulfonate | 0.50 |
| Water | 5.50 |

Test results for the brick of Procedure A are tabulated in Table IV:

TABLE IV

| | |
|---|---|
| Green: Bulk density (p.c.f.) | 147.1 |
| Burned: Bulk density (p.c.f.) | 120.0 |
| Modulus of Rupture (p.s.i.) | 927 |
| Cold Crushing (p.s.i.) | 5959 |
| Specific gravity | 2.32 |
| Absorption (percent) | 8.91 |
| Porosity (percent) | 17.13 |
| Load to failure (temperature) | 3110° |

McCreight, U.S. 3,144,345, issued Aug. 11, 1964, teaches the advantage obtained from the addition of 1–5 percent fumed silica to a refractory silica mix. Brick produced by such a method were found to have about a 10 percent decrease in porosity and about a 5 percent increase in bulk density as compared to the same mix not having fumed silica added. An increase in abrasion resistance and modulus of rupture was also obtained.

The addition of $Ca(NO_3)_2$ to a silica refractory mix containing fumed silica, as taught by the instant invention, produced a 2 percent increase in the burned bulk density, a 66 percent increase in cold crushing strength and a decrease of 13 percent in the porosity as compared to a mix of the same composition but without $Ca(NO_3)_2$. The increase in the relative green bulk density figure in

[1] All ASTM test results contained herein were obtained according to the manual of ASTM Standards on Refractory Materials (1963).

Example I is believed to indicate that the calcium nitrate acts as a pressing aid when the solution is used as the tempering fluid.

The fumed silica used in Example I was produced from the ferrosilicon process and was sub-micron in particle size. It is theorized that the small particle size of the amorphous silica enables the silica to act as an "interstitial filler" within the refractory structure. Other forms of silica that are suitable for use in the method of the invention include ethyl orthosilicate, which decomposes during firing to form silica of the requisite degree of finess, silica sols in which the silica particle size is in the sub-micron range, colloidal silica, and silica aerogels.

EXAMPLE II

A refractory batch having the following composition was prepared as described in Example I, except that fumed silica was not added to the refractory mix. The silica pebble used had the chemical composition and sizing shown in Table I and Table II.

| | Parts |
|---|---|
| Silica pebble | 100.00 |
| Added: | |
| CaO added as $Ca(OH)_2$ | 1.52 |
| Lignin sulfonate | 0.50 |
| CaO added as $Ca(NO_3)_2$ (50% aqueous solution) | 1.27 |

The batch ingredients were then formed into bricks and fired in the manner described in Example I, and the bricks were tested with the following results:

TABLE V

| | |
|---|---|
| Green: Bulk density (p.c.f.) | 146.3 |
| Burned: Bulk density (p.c.f.) | 119.6 |
| Modulus of rupture (p.s.i.) | 959 |
| Cold crushing, (p.s.i.) | 6935 |
| Specific gravity | 2.32 |
| Absorption (percent) | 9.21 |
| Porosity (percent) | 17.64 |
| Load to failure (temperature) | 3110° |

Comparative Procedure B

For purposes of comparison, but not in accordance with the invention, silica brick were prepared and fired using the procedure detailed in Example II, except $Ca(NO_3)_2$ was not added to the mix.

| | Parts |
|---|---|
| Silica pebble [1] | 100.00 |
| Added: | |
| CaO added as $Ca(OH)_2$ | 3.04 |
| Lignin Sulfonate | 0.50 |
| Water | 4.56 |

[1] Previously identified.

The batch ingredients were then formed into bricks and fired in the manner described in Example I, and the bricks were tested, with the following results:

TABLE VI

| | |
|---|---|
| Green: Bulk density (p.c.f.) | 142.9 |
| Burned: Bulk density (p.c.f.) | 115.5 |
| Modulus of rupture (p.s.i.) | 769 |
| Cold crushing (p.s.i.) | 4526 |
| Specific gravity | 2.32 |
| Absorption (percent) | 10.22 |
| Porosity (percent) | 19.39 |
| Load to failure (temperature) | 3110° |

A comparison of test results from Example II and Comparative Procedure B demonstrates that the addition of $Ca(NO_3)_2$ produced an increase of 3.5 percent in the burned bulk density, an increase of greater than 50 percent in the cold crushing strength, and a decrease of almost 10 percent in the apparent porosity. The increase in the green bulk density is believed to show that the calcium nitrate acts as a pressing aid when the solution is used as a tempering fluid.

The test results indicate that use of calcium nitrate as a CaO-yielding solution produces an increase in both green bulk density and burned bulk density and in cold crushing strength. The calcium nitrate produces a decrease in apparent porosity and the absorption of the silica brick. It is believed that the most homogenous attainable distribution of the CaO is achieved during its deposition as the solvent is driven off in curing. During burning of the refractory the $Ca(NO_3)_2$ is believed to decompose into a gas plus CaO which because of its origin is very reactive and readily combines with the silica present.

The calcium nitrate can be readily obtained from commercial sources in sufficient purity, preferably at least 80 percent $Ca(NO_3)_2$. Its solubility at room temperature in water, which is usually the preferred tempering liquid, allows the use of concentrations of up to approximately 55 percent, higher concentrations being attainable by heating. Another advantage of using $Ca(NO_3)_2$ is that it acts as a pressing aid, making possible the attainment of higher green density in pressed brick or other refractory shapes than has previously been possible through most conventional production techniques. This gain in green density is in turn responsible for higher burned density.

The required solution in the refractory mix of the $Ca(NO_3)_2$ in a suitable solvent can be formed in various ways. The $Ca(NO_3)_2$ can be dry mixed into the refractory grain so that when a solvent therefor is added to temper the admixture, the solution of the $Ca(NO_3)_2$ is formed during mixing. It is also possible to coat or saturate one or more constituents of the batch with the soluble $$Ca(NO_3)_2$$

solution, dry these treated constituents, include them in the admixture, and by tempering the admixture with a solvent for the $Ca(NO_3)_2$, form the required solution during mixing. The preferred method of the invention is to use the premixed solution of the $Ca(NO_3)_2$ to temper the admixture, prior to forming the admixture into a brick or other shape. Since a tempering liquid must be added to the refractory mix to enable pressing a refractory shape therefrom, the $Ca(NO_3)_2$ is ultimately dissolved in the tempering liquid by all of the procedures described in this paragraph. The preferred method of using a solution of the $Ca(NO_3)_2$ as a tempering liquid is the most effective production method for practicing the invention.

EXAMPLE III

A refractory brick was prepared as described in Example I except that an impact press was used for forming and the silica pebble had the following grain sizing as indicated by percentages of fraction:

| | Percent |
|---|---|
| −3+6 mesh | 35 |
| −6+12 mesh | 12 |
| −12+35 mesh | 15 |
| −35 mesh | 4 |
| −100 mesh | 34 |

The batch had the following composition:

| | Parts |
|---|---|
| Silica pebble | 100 |
| Added: | |
| CaO added as $Ca(OH)_2$ | 1.52 |
| Fumed silica | 4.00 |
| Lignin sulfonate | 0.50 |
| CaO added as $Ca(NO_3)_2$ (50% aqueous solution) | 1.19 |

The silica pebble used had the chemical composition set forth in Example I.

The batch ingredients were then formed into bricks and burned in the manner described in Example I, except that the impact press was used, and the bricks were tested with the following results:

TABLE VII

| | |
|---|---|
| Burned: Bulk density (p.c.f.) | 125.4 |
| Modulus of rupture (p.s.i.) | 1178 |
| Cold crushing (p.s.i.) | 13,940 |
| Specific gravity | 2.31 |
| Absorption (percent) | 6.7 |
| Porosity (percent) | 13.5 |
| Load to failure (temperature) | 3100° |
| Permeability (CGS Units) | 0.01 |
| (Centidarcys) | 18.9 |
| Percent Tridymite (by X-ray) (approximately) | 42 |

Comparative Procedure C

For purposes of comparison, but not in accordance with the invention, silica brick were prepared and fired on a production basis, using approximately the same procedure detailed in Example III, except that $Ca(NO_3)_2$ was not added to the mix. The batch had the following composition:

| | Parts |
|---|---|
| Silica pebble | 100 |
| Added: | |
| CaO added as $Ca(OH)_2$ | 3.04 |
| Lignin sulfonate | 0.50 |
| Water | 4.50 |

The silica pebble used had approximately the same sizing and the same chemical composition as that used in Example III.

The batch ingredients were then formed into bricks using a mechanical toggle press, and fired as described in Example I. The following test results represent average production data:

TABLE VIII

| | |
|---|---|
| Burned: Bulk density (p.c.f.) | 115 |
| Modulus of rupture (p.s.i.) | 750 |
| Cold crushing (p.s.i.) | 3000 |
| Specific gravity | 2.33 |
| Absorption (percent) | 11.2 |
| Porosity (percent) | 20.0 |
| Load to failure (temperature) | 3100° |
| Permeability (CGS Units) | 0.07 |
| (Centidarcys) | 132.2 |
| Percent Tridymite (by X-ray) (approximately) | 35 |

It will be observed that the brick produced by the method of Example III had a burned bulk density of 125.4 p.c.f., while those produced by the method of Example I had a burned bulk density of 122.7 p.c.f. This difference is attributed to the use of an impact press in producing the brick of the Example III method, and a hydraulic press in the Example I method. This difference illustrates the extent to which calcium nitrate facilitates flow and compaction during the pressing operation. It will be observed that a mechanical toggle press was used in producing the brick by Comparative Procedure C, rather than the impact press used in the procedure described in Example III; however, other work indicates that, unless calcium nitrate or an equivalent is used in a batch of the type in question, substantially the same results are achieved with the toggle press, with the hydraulic press or with the impact press. Accordingly, it is believed that the data of Comparative Procedure C can validly be compared with the data of Example III.

The X-ray diffraction studies listed in Tables VII and VIII demonstrate that brick made according to the invention contain a higher percentage of the more desirable tridymite, formed at the expense of cristobalite, than brick made according to the teachings of the prior art.

Spalling in silica brick is related to sudden reversible changes in the crystal structures of the silica minerals (quartz, cristobalite, and tridymite) which occur at temperatures below 1100°. The sudden changes in structure, called inversions, are accompanied by significant volume changes. In a properly burned silica brick, quartz will be essentially absent, having been transformed in burning to cristobalite and tridymite. Of these two minerals, cristobalite is the less desirable form since inversion, which occurs at 400–600°, produces a sudden volume change of almost 2 percent, as compared with a volume change of about 0.5 percent which occurs during the tridymite inversion at 240–350°.

In addition to this evidence from X-ray diffraction studies, the thermal expansion curves shown in FIG. I indicate the presence of less cristobalite in the brick made according to the method of the invention. Curve 1 shows that the brick made according to the invention has a slightly greater amount of expansion below 400° (due to increased tridymite content), and a lower expansion between 400–600° (due to decreased cristobalite content).

Tables VII and VIII show that the brick produced by the method of the invention exhibit a markedly lower permeability than brick; and made according to the teachings of the prior art. Brick used under severe operating conditions, for example, crown brick in glass producing furnaces, must withstand penetration of and attack by vapors, liquids and even fine particulate matter from batch carry-over and volatile flux. A decrease in permeability, of the magnitude shown in Example III, indicates that silica brick produced according to the method of the invention would give a superior performance under the aforementioned severe operating conditions.

EXAMPLE IV

A refractory brick was also prepared as described in Example I except that ganister was substituted for a part of the silica pebble. The silica portion of the batch had the following grain sizing as indicated by percentages of fraction and silica raw material:

| | Percent |
|---|---|
| −6+12 mesh ganister | 50 |
| −35 mesh ganister | 10 |
| −100 mesh silica pebble [1] | 40 |

[1] Previously identified.

The ganister had the following chemical analysis:

| | Percent |
|---|---|
| $SiO_2$ (by difference) | 98.93 |
| $Al_2O_3$ | 0.60 |
| $Fe_2O_3$ | 0.20 |
| $TiO_2$ | 0.10 |
| $Na_2O$ | 0.02 |
| $K_2O$ | 0.15 |
| CaO | Trace |
| MgO | Trace |

The batch had the following composition:

| | Parts |
|---|---|
| Ganister+silica pebble | 100 |
| Added: | |
| CaO added as $Ca(OH)_2$ | 1.52 |
| Fumed silica | 4.0 |
| Lignin sulfonate | 0.5 |
| CaO added as $Ca(NO_3)_2$ (45% aqueous solution) | 1.12 |

The bricks, produced as described in Example I, were tested with the following results:

TABLE IX

| | |
|---|---|
| Burned: Bulk density (p.c.f.) | 120.5 |
| Modulus of rupture (p.s.i) | 1364 |
| Cold crushing (p.s.i.) | 13,994+ |
| Specific gravity | 2.30 |
| Absorption (percent) | 8.08 |
| Porosity (percent) | 15.66 |

It will be appreciated from the foregoing discussion and examples that significant and unexpected advantage is achieved according to the method of the invention by adding at least about 10 percent of the mineralizer as calcium nitrate dissolved in the tempering liquid. From 1 to 5 percent total, based on an oxide analysis, of the mineralizer can be present. The mineralizer can be magnesium hydroxide, magnesia, or hydrated or lightly burned caustic lime. Up to 10 percent of sub-micron silica and from 0.25 to 5 percent of a temporary binding agent, such as lignin sulfonate, can be used. Preferably, the calcium nitrate dissolved in the tempering liquid constitutes from 0.25 to 4 percent, calculated as CaO, and based upon the dry weight of the batch ingredients. Most desirably, the dissolved calcium nitrate, on the indicated basis, constitutes about 1 to 1.5 percent of the batch ingredients. While the calcium nitrate is conveniently added dissolved in the tempering liquid, as described in the examples hereof, the dissolution can be accomplished in other ways, as discussed above, and can even be formed by reaction between nitric acid and calcium hydroxide or lightly burned caustic lime.

It has also been found that when the calcium nitrate or an equivalent is used in accordance with the instant invention in producing a silica brick, mineralizers other than the conventional lime or lightly burned caustic magnesia, can also be used to advantage. The following example illustrates this point.

EXAMPLE V

A series of refractory batches was prepared by dry-mixing silica, dead burned magnesia fines [1] (98% MgO), fumed silica, lignin sulfonate and calcium nitrate solution, as well as a control in which calcium hydroxide was used in place of the dead burned magnesia fines in the batch. In all cases, the calcium nitrate solution was used to temper the batch. Several batch compositions were as follows:

| | Parts | | | |
|---|---|---|---|---|
| | Brick A | Brick B | Brick C | Brick D |
| Silica pebble | 100 | 100 | 100 | 100 |
| Added: | | | | |
| CaO added as $Ca(OH)_2$ | 1.52 | | | |
| Magnesia fines | | 1.2 | 1.6 | 2.0 |
| Fumed silica | 4.0 | 4.0 | 4.0 | 4.0 |
| Lignin sulfonate | 0.5 | 0.5 | 0.5 | 0.5 |
| CaO added as $Ca(NO_3)_2$ (45% aqueous solution) | 1.07 | 1.07 | 1.0 | 1.04 |

The silica pebble had the analysis previously set forth, and the following grain sizing, indicated by percentages of fractions:

| | Percent |
|---|---|
| −6+12 mesh | 50 |
| −35 mesh | 10 |
| −100 mesh | 40 |

The bricks, produced as described in Example I, were tested with the following results:

| | Brick A | Brick B | Brick C | Brick D |
|---|---|---|---|---|
| Burned: Bulk density (p.s.f.) | 121.7 | 118.6 | 119.9 | 121.7 |
| Modulus of rupture (p.s.i.) | 946 | 1,161 | 1,124 | 1,220 |
| Cold crushing (p.s.i.) | 6,153 | 6,547 | 8,133 | 8,873 |
| Specific gravity | 2.32 | 2.33 | 2.33 | 2.30 |
| Absorption (percent) | 7.94 | 8.92 | 8.63 | 8.13 |
| Porosity (percent) | 15.56 | 17.17 | 16.73 | 15.02 |

EXAMPLE VI

A series of refractory silica brick batches was also prepared to illustrate that either magnesium hydroxide or lightly burned caustic magnesia can also be used as a mineralizer in producing silica brick according to the

[1] Dead burned magnesia ball mill flues essentially all passing a 200 mesh screen.

invention. The several batches are identified in the following table.

|  | Parts | | | |
| --- | --- | --- | --- | --- |
|  | Brick E | Brick F | Brick G | Brick H |
| Silica pebble | 100 | 100 | 100 | 100 |
| Added: | | | | |
| Magnesium hydroxide | | | 2.0 | 2.5 |
| Lightly burned caustic magnesia | 1.4 | 1.8 | | |
| Fumed silica | 4.0 | 4.0 | 4.0 | 4.0 |
| Lignin sulfonate | 0.5 | 0.5 | 0.5 | 0.5 |
| CaO added as Ca(NO₃)₂ (45% aqueous solution) | 1.01 | 1.04 | 1.07 | 1.12 |

The silica pebble had the composition set forth above, and the particle size distribution set forth in Example V. The batch ingredients were formed into bricks and fired as described in Example I. Testing of the bricks gave the following results:

|  | Brick E | Brick F | Brick G | Brick H |
| --- | --- | --- | --- | --- |
| Burned: Bulk density (p.c.f.) | 120.9 | 120.0 | 119.6 | 119.2 |
| Modulus of rupture (p.s.i.) | 821 | 904 | 1,118 | 1,054 |
| Cold crushing (p.s.i.) | 7,883 | 5,964 | 7,263 | 5,162 |
| Specific gravity | 2.33 | 2.33 | 2.34 | 2.33 |
| Absorption (percent) | 8.41 | 9.01 | 8.99 | 9.32 |
| Porosity (percent) | 16.37 | 17.36 | 17.35 | 17.85 |

It will be appreciated from the foregoing data that other nonconventional mineralizers for example, dicalcium silicate, forsterite, monticellite, merwinite and burned dolomite can also be used in producing silica brick according to the invention.

It has also been found that calcium chloride dissolved in the tempering liquid can be used as an equivalent for calcium nitrate in practicing the method of the invention. However, when calcium chloride is used, some care is necessary to prevent sealing of the brick pores during drying. The use of a comparatively dilute calcium chloride solution for tempering, and a comparatively small amount thereof, to prevent the sealing of pores is illustrated in the following example.

EXAMPLE VII

Brick batches were produced using the silica pebble identified in Example I. The batches were as follows:

|  | Parts | |
| --- | --- | --- |
|  | Brick I | Brick J |
| Silica pebble | 100 | 100 |
| CaO added as Ca(OH)₂ | 0.75 | 1.52 |
| Fumed silica | 4.0 | 4.0 |
| Lignin sulfonate | 0.5 | 0.5 |
| CaO added as CaCl₂ (50% aqueous solution) | 1.7 | |
| CaO added as CaCl₂ (35% aqueous solution) | | 1.02 |

The bricks, produced as described in Example I, were tested with the following results:

|  | Brick I | Brick J |
| --- | --- | --- |
| Burned: Bulk density (p.c.f.) | 119.6 | 122.2 |
| Modulus of rupture (p.s.i.) | 775 | 1,121 |
| Cold crushing (p.s.i.) | 6,469 | 8,221 |
| Specific gravity | 2.32 | 2.32 |
| Absorption (percent) | 8.82 | 7.96 |
| Porosity (percent) | 16.97 | 15.60 |

It will be observed that Brick I had a lower burned bulk density than did Brick J, and that most of the other physical properties thereof were inferior to the corresponding properties of Brick J. It has been found that if a 50% calcium chloride solution is used for tempering, and an even greater proportion than was used in preparing Brick I, extreme bloating will occur and rupture of the brick may occur during firing, or even during drying. In view of these facts it is believed that the lower burned bulk density and other physical properties of Brick I, by comparison with Brick J, are attributable to limited bloating, which occurs because of sealing of pores of the brick during drying. This sealing was effectively eliminated in producing Brick J because the quantity of calcium chloride used was sufficiently low to prevent the formation of pore-sealing films during drying. Higher concentrations, total amounts, or both of calcium chloride can be used if suitable precautions are taken during the drying operation to prevent sealing of the brick pores, and consequent bloating or incipient bloating during the firing. For example, controlled humidity drying can be used, or infrared drying can be used to minimize the temperature gradient from the interior to the exterior of the brick. Optimum results have been achieved by controlling the concentration of the calcium chloride, relative to the total amount of the tempering liquid to prevent the undesired sealing of the brick pores during drying.

Both calcium nitrate and calcium chloride are hygroscopic in nature, the latter to a greater extent than the former. It is, therefore, important in practicing the method of the invention to prevent excessive absorption of moisture from the time the shape is formed until firing thereof has been effected. This can be accomplished by drying the brick promptly after shaping and firing promptly after drying, or by using controlled humidity storage between shaping and drying, between drying and firing, or both.

What I claim is:

1. In a method for preparing a silica refractory which includes the steps of:
   (a) preparing a mixture consisting essentially of size-graded silica rock, a mineralizer selected from the group consisting of magnesium hydroxide, magnesia and hydrated or light burned caustic lime, silica that is sub-micron in particle size, and a temporary binder agent to produce a refractory batch containing from about 1 to 5 percent total, on the basis of an oxide analysis, of the mineralizer, up to 10 percent submicron silica, and about 0.25 to 5 percent of a temporary binding agent, the remainder being the size-graded silica rock,
   (b) mixing therewith a sufficient amount of liquid to temper said mixture,
   (c) forming said mixture into a shape,
   (d) drying said shape, and
   (e) firing said shape, the improvement of increasing both the green and fired density and decreasing the permeability of the shape by providing at least about 10 percent of the mineralizer as a calcium salt selected from the group consisting of calcium chloride and calcium nitrate dissolved in the tempering liquid prior to the forming of a shape from the mixture thereof with the silica rock, controlling the time interval between forming and firing to prevent excessive absorption of moisture, and, when a part of the mineralizer is added as calcium chloride, controlling the concentration of calcium chloride used relative to the amount of said tempering liquid to prevent sealing of the brick pores during drying.

2. In a method as described in claim 1 the improvement wherein the calcium salt is Ca(NO₃)₂ and is dissolved in the tempering liquid prior to the addition of the tempering liquid to said mixture.

3. In a method as described in claim 1, the improvement wherein the tempering liquid contains from 0.25–4 percent Ca(NO₃)₂, calculated as CaO, and based upon the dry weight of the batch ingredients.

4. In a method as described in claim 1, the improvement wherein the tempering liquid contains about 1 to 1.5 percent Ca(NO₃)₂, calculated as CaO, and based upon the dry weight of the batch ingredients.

5. In a method as described in claim 1, the improvement wherein the calcium salt is CaCl₂, and is dissolved in the tempering liquid prior to the addition of the tempering liquid to said mixture.

6. In a method as claimed in claim 5, the improvement wherein the concentration of CaCl₂ is controlled relative to the total amount of the tempering liquid to prevent sealing of the brick pores during drying.

7. In a method as described in claim 1, the improvement wherein the tempering liquid contains from 0.25–4 percent $CaCl_2$, calculated as CaO, and based upon the dry weight of the batch ingredients.

8. In a method as described in claim 1, the improvement wherein the mineralizer, in addition to the calcium chloride or calcium nitrate, is dead burned magnesia.

References Cited

UNITED STATES PATENTS

| | | | |
|---|---|---|---|
| 2,351,204 | 6/1944 | Harvey et al. | 106—69 |
| 3,144,345 | 8/1964 | McCreight et al. | 106—69 |

JAMES E. POER, Primary Examiner

U.S. Cl. X.R.

106—69